United States Patent [19]

Mally et al.

[11] Patent Number: 5,226,316
[45] Date of Patent: Jul. 13, 1993

[54] PACKAGE LEAK DETECTION

[75] Inventors: Timothy G. Mally, Oregon; Carl W. Johnson, Neenah, both of Wis.

[73] Assignee: Oscar Mayer Foods Corporation, Madison, Wis.

[21] Appl. No.: 855,995

[22] Filed: Mar. 20, 1992

[51] Int. Cl.⁵ .............................................. G01M 3/02
[52] U.S. Cl. ...................................... 73/49.3; 73/49.2
[58] Field of Search .................... 73/41, 45, 49.3, 52, 73/45.4, 49.2 R

[56] References Cited

U.S. PATENT DOCUMENTS

| | | | |
|---|---|---|---|
| 3,371,781 | 3/1968 | Armbruster et al. | 73/52 |
| 3,667,281 | 6/1972 | Pfeifer | 73/37 |
| 3,744,210 | 7/1973 | O'Lenick et al. | 73/49.3 X |
| 3,837,215 | 9/1974 | Massage | 73/45.4 |
| 3,918,293 | 11/1975 | Feigel | 73/49.3 |
| 3,973,249 | 8/1976 | Yokote et al. | 73/49.3 |
| 3,991,622 | 11/1976 | Oowada | 73/49.3 |
| 4,024,956 | 5/1977 | Cassidy | 73/49.3 |
| 4,326,408 | 4/1982 | Kanoh | 73/49.3 |
| 4,663,964 | 5/1987 | Croce | 73/49.3 |
| 4,706,494 | 11/1987 | Creed et al. | 73/49.3 |
| 4,709,578 | 12/1987 | Iwasaki et al. | 73/49.3 |
| 4,715,215 | 12/1987 | Perhach et al. | 73/49.3 |
| 4,747,298 | 5/1988 | McDaniel | 73/49.3 |
| 4,747,299 | 5/1988 | Fox et al. | 73/49.3 |
| 4,771,630 | 9/1988 | Croce et al. | 73/49.3 |
| 4,774,830 | 10/1988 | Hulsman | 73/49.3 |
| 4,803,868 | 2/1989 | Vinton et al. | 73/49.3 |
| 4,858,463 | 8/1989 | Rosse et al. | 73/49.3 |
| 4,901,558 | 2/1990 | Leining et al. | 73/49.3 |
| 4,930,342 | 6/1990 | McDaniel | 73/49.3 |
| 4,934,180 | 6/1990 | Hulsman | 73/49.3 |
| 5,029,464 | 7/1991 | Lehmann | 73/49.3 |
| 5,042,291 | 8/1991 | Lehmann | 73/49.3 |

FOREIGN PATENT DOCUMENTS 1120200 4/1977 U.S.S.R. .
1328701 2/1978 U.S.S.R. .

OTHER PUBLICATIONS

Seal Integrity Systems, Inc. sales brochure.

Primary Examiner—Hezron E. Williams
Assistant Examiner—Michael Brock
Attorney, Agent, or Firm—Lockwood, Alex, Fitzgibbon & Cummings

[57] ABSTRACT

An apparatus and a method are provided for detecting leaks in sealed packages. The apparatus and method are particularly well-suited for an on-line system wherein each package filled and sealed on a commercial packaging line is inspected for possible leaks or seal defects. A force transducer arrangement is used, and the package is maintained at substantially constant volume while positive wall pressure over time is monitored. Diagnostic properties can be included whereby it is possible to precisely detect exactly which compartment of a multiple-compartment package and exactly which package station, has an excessive incidence of defects.

28 Claims, 7 Drawing Sheets

PACKAGE LEAK DETECTION

DESCRIPTION

Background and Description of the Invention

The present invention generally relates to an apparatus and method for detecting leaks in sealed packages. More particularly, the invention relates to an apparatus and method for inspecting seals of packages by monitoring the force on a package wall resulting from pressure within the package and while the package is under substantially constant package volume conditions when the ambient pressure external of the package is dropped. The apparatus and method are arranged so as to be suitable for permitting non-destructive inspection of virtually each package that is filled and sealed along a commercial-scale packaging line. The force on the package wall is monitored through the use of a force transducer or load cell that contacts the wall and measures the amount of force applied to the package wall by the gas within the package.

Various items are packaged within commercial scale equipment on a high-speed basis. With respect to certain products that are packaged in this manner, such as food products, medicaments or medical device products, at the time each package is sealed, it is subjected to so-called gas flushing operations or to vacuum packaging procedures. The result is a so-called gas flushed or vacuum sealed package. In gas flushed packages, the product is packaged within an atmosphere of a gas other than air, such as nitrogen, carbon dioxide and other gases well-known for gas flushing operations. In this way, the product is stored within an environment that enhances an important characteristic of the product, for example retardation of spoilage or other deterioration such as moisture loss or staleness, and generally speaking, an overall improvement of the shelf life of the product. Vacuum packages virtually avoid the presence of air or any other gas within the package in order to obtain similar effects. In order to achieve these desirable effects, it is important, of course, that the gas flushed environment remain within the package or that the vacuum conditions persist during the course of transportation, storage and display. Leaks cannot be tolerated. Even the finest leak will result in loss of the gas flushed atmosphere or of the vacuum condition for packages that are designed to have a long shelf life.

A particularly difficult leak detection problem is created for packaging of meat products or products including meat in gas flushed bags, pouches or other packages because it is extremely difficult to determine by inspection whether or not seals on the packages are in fact intact. Such seals can be between flexible film and rigid or semi-rigid shaped and/or formed bubbles or trays, or they can be between two or more flexible film webs or panels. The leak detection task is made more difficult for packages which have printed film which can obscure or hide a seal defect which cannot be seen even under careful inspection by the human eye. In some products, printed films are specifically avoided so as to facilitate seal inspection, sometimes requiring costly additional packaging members such as cover cartons or sleeves to provide printed information.

Numerous types of leak detection devices for packages have been previously known or proposed. Some of these other seal inspection devices are of a passive type in which there is no active force imposed on the seal being inspected. These types of devices are not particularly reliable. Another type of seal inspection device utilizes negative pressure on the package while it is being tested. Reliability is compromised because the pressure on the seal area can actually close off certain leaks at the time the test is conducted, thereby temporarily obscuring a leak which will manifest itself once the negative pressure testing is completed.

Other test devices use a positive pressure approach wherein an active force on the seal is created such that the package tends to expand thereby imparting a pressure directed toward separation of the package panels at the seal areas. Typically, these positive pressure devices detect substantial movement of a wall of a package, which movement is monitored and translated into a leak detection function. Exemplary in this regard are U.S. Pat. Nos. 4,663,964 and 4,771,630. With these types of devices, a linear variable differential transducer is used to detect movement of flexible package surfaces. Detection of this movement is translated into information for determining whether or not a leak is present. This movement itself can create a stress on the package which can be excessive to the extent that leaks are actually caused by the testing equipment. Approaches of this type are particularly undesirable for use in seal inspection stations that check for leaks in every package produced on a commercial line because they create the risk of unintentionally causing leaks in packages that otherwise would have exhibited adequate seal integrity over the target shelf life for the packages.

It has been found that, by proceeding in accordance with the present invention, it is possible to maintain the advantages of a positive pressure type of leak detection system without creating any significant risk of having the testing device actually cause leaks in packages which otherwise would have been acceptable. The invention does not close or otherwise thus obscure actual leaks, and it does not present conditions wherein the leak detecting device itself causes leaks unless there is a weakness defect or foreign material in the seal, in which case the invention can be practiced to transform an otherwise latent defect into one which is readily detected.

In summary, the present invention is directed to seal inspection for sealed packages wherein the filled and sealed package is positioned within a support assembly and under conditions where the volume of the package will remain substantially constant throughout the testing procedure. By providing an opening or openings within the support assembly, a gas flushed package is subjected to an external pressure below that within the package, thereby imparting a positive pressure condition on the package. One of the walls of the cavity, preferably a wall adjacent the opening or openings through which the reduced pressure atmosphere is transmitted to the package, includes a force transducer or strain gauge that detects the increase in positive wall pressure develop within the package by the reduced pressure atmosphere. By this approach, the wall pressure is monitored over time while the package volume is maintained substantially constant. In the event of leak, the wall pressure will not rise to the same extent as for a package that is totally devoid of leaks to the exterior of the package. For a vacuum sealed package, virtually the same approach is utilized, except the atmosphere will be at a pressure greater than the expected pressure within the package, and an increased force on the strain gauge indicates a leak.

It is accordingly a general object of the present invention to provide an improved apparatus and method for leak inspection of filled and sealed packages.

Another object of this invention is to provide an improved apparatus and method for detecting leaks in packages as they are filled and sealed along a commercial-scale packaging line.

Another object of the present invention is to provide an improved apparatus and method wherein a positive pressure approach is used to create an increase in package wall pressure over time which is translated into leak detection, including the detection of slow leaks across the seal or through a package wall.

Another object of the invention is to provide an improved apparatus and method which allows for pre-acceptance "shock" testing whereby inherently weak seals intentionally are broken open in order to expose seals that have foreign material therein or that are not strong enough to survive the handling and storage conditions expected for the package, while avoiding any damage to packages which meet desired strength criteria.

Another object of the present invention is to provide an improved apparatus and method which utilize a positive internal pressure approach without unintentionally subjecting secure packages to wall movement conditions such as pillowing that create leaks or package rupture in otherwise acceptable packages.

Another object of this invention is to provide an improved apparatus and method for detecting leaks in packages which are gas flushed, vacuum sealed, autoclaved or the like.

These and other objects, features and advantages of the present invention will be clearly understood through a consideration of the following detailed description.

BRIEF DESCRIPTION OF THE DRAWINGS

In the course of this description, reference will be made to the attached drawings, wherein.

DESCRIPTION OF THE PARTICULAR EMBODIMENTS

Figure 1:
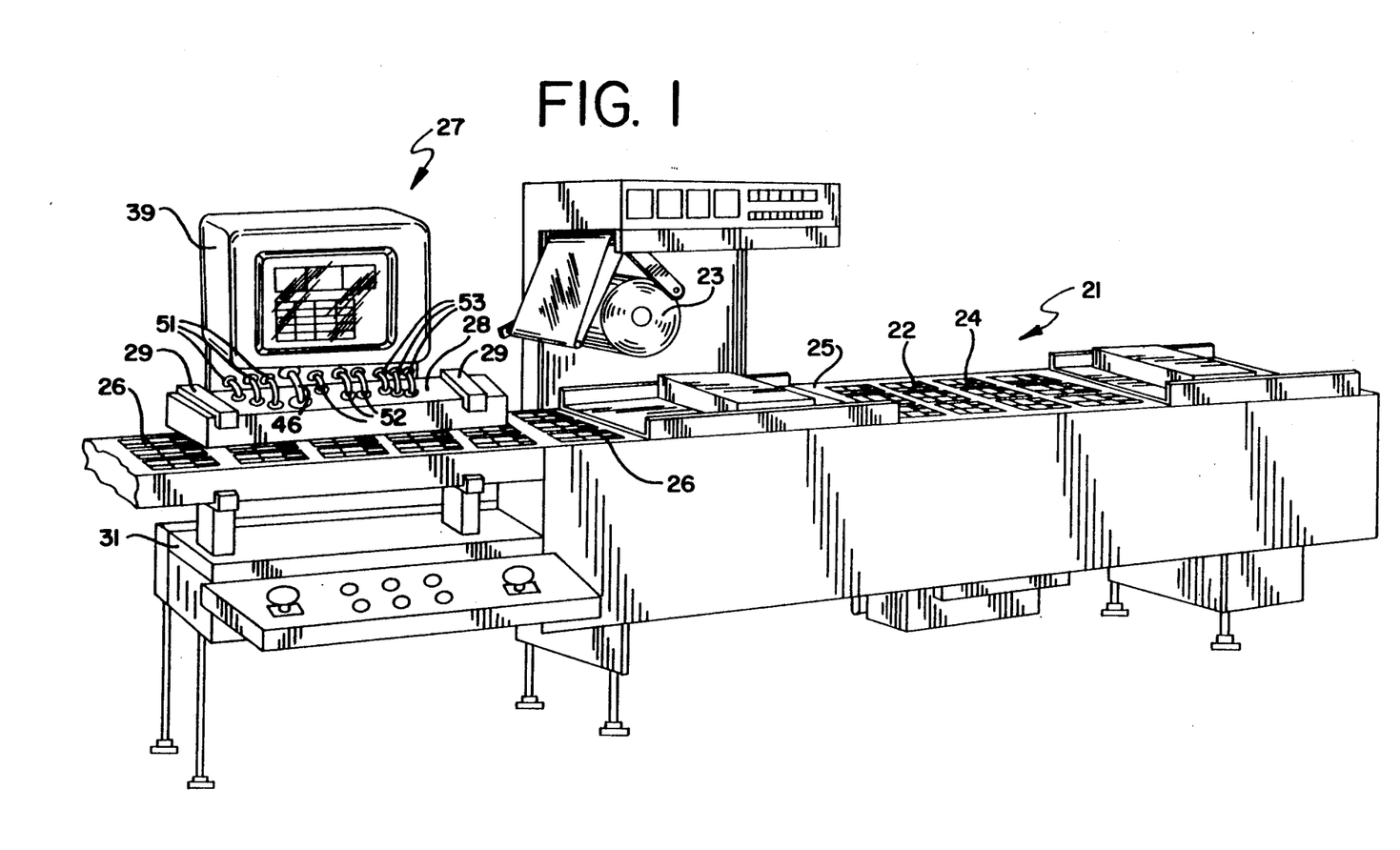
FIG. 1 is a perspective view of a portion of the packaging line which includes one embodiment of a leak detection station for inspecting seals of each package processed through the line.

A portion of a packaging line, for example a convention fill and seal unit, generally designated 21, is illustrated in FIG. 1. This equipment is capable of supporting, filling and sealing a continuous stream of package components 22. In the illustrated embodiments, multiple-compartment package components 22 are filled with products such as food products and are then sealed with a flexible filled web 23 in a manner well known in the art. Suitable equipment in this regard is available from Mahaffy & Harder Engineering Company. Each package component 22 rests within a support frame 24 which progresses along the unit 21 within a suitable conveyor assembly 25 in a manner well known in the art. After passing through the station wherein the flexible film web 23 is sealed to each package component 22, completed packages 26 are conveyed to a seal inspection station, generally designated 27.

Seal inspection station 27 includes a continuation of the conveyor assembly 25. In the illustrated embodiment, each completed package 26 is passed to a test chamber where it is subjected to testing to determine which, if any, of the completed packages 26 need to be rejected due to inadequate seal formation. A cavity cover or test head 28 is positioned in opposing fashion with respect to conveyor assembly 25. In the illustrated embodiment, the test head 28 is movable in an up-and-down fashion. Suitable means such as extendable and retractable bracket assemblies 29 are mounted in customary fashion to an appropriate frame assembly 31. A central processing unit 39 preferably having a display monitor 32 is also included as illustrated.

The illustrated packages include a plurality of compartments having items such as food products sealed therewithin by means of a flexible cover film 33. While multiple-cavity package components 22 are illustrated, the invention would be suitable for single-cavity packages. The package component 22 may be a semi-rigid or substantially rigid member to the extent it will retain its shape and volume when subjected to lowered pressure testing conditions. If not semi-rigid or substantially rigid, other means should be provided in order to ensure the package will remain at substantially constant volume even when subjected to external pressures substantially lower than the package atmosphere. Each package also typically includes a peripheral seal area 34 which is the seal area subjected to inspection in accordance with the invention. Intermediate seal areas 35 can be included if desired. Typically, these intermediate seal areas are not critical to maintenance of shelf life inasmuch as, in most instances, adjacent compartments of the package are flushed with the same type of protective gas for the various products such as food product 36, 37, 38 within each compartment 41, 42, 43.

The embodiment of the test station shown in FIGS. 1-6 is designed to accommodate completed packages 26 having package components 22 which are trays containing seven separate compartments. The thus illustrated test chamber is capable of simultaneously inspecting nine such completed packages 26. The embodiment of the test station shown in FIGS. 7-11 is designed to simultaneously inspect four completed packages each having trays containing three separate compartments.

Figure 3:
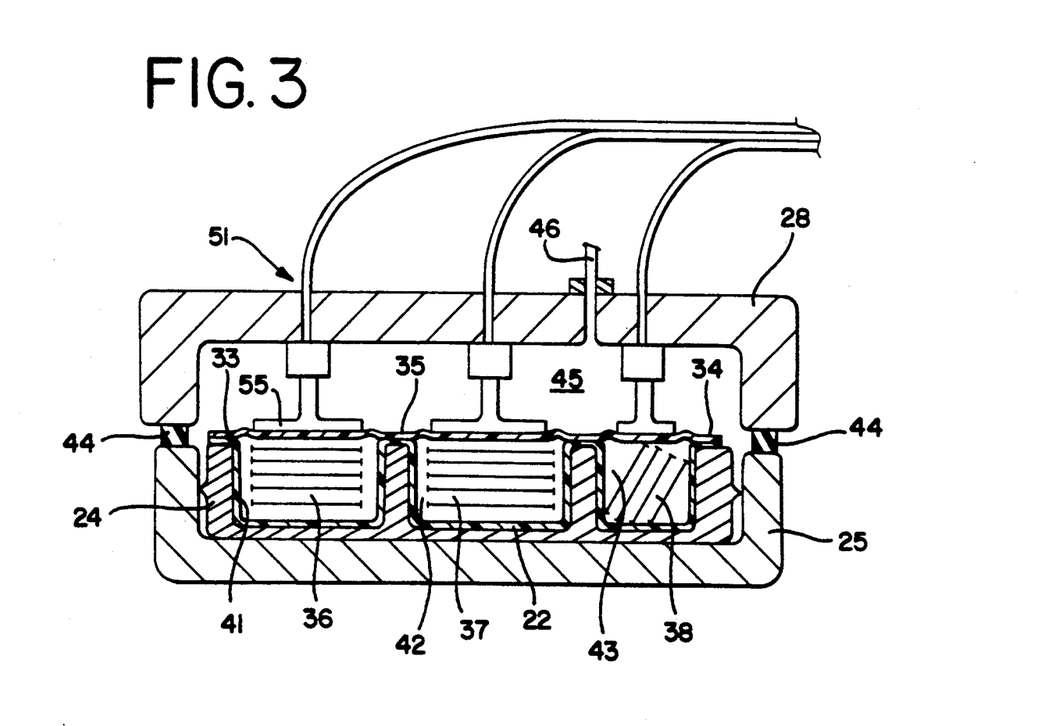
FIG. 3 is an inverted cross-sectional view along the line 3—3 of FIG. 2.

FIG. 3 illustrates the closed mode of the test chamber of seal inspection station 27 wherein the test head 28 is in sealing engagement with a specially designed containment compartment of conveyor assembly 25. Preferably, a seal 44 ensures maintenance of a substantially air-tight test cavity 45. A suitable passageway 46 communicates with appropriate pump means for purposes of withdrawing or adding air or other gases within the cavity 45 prior to initiation of the testing carried out by the device.

Figure 2:
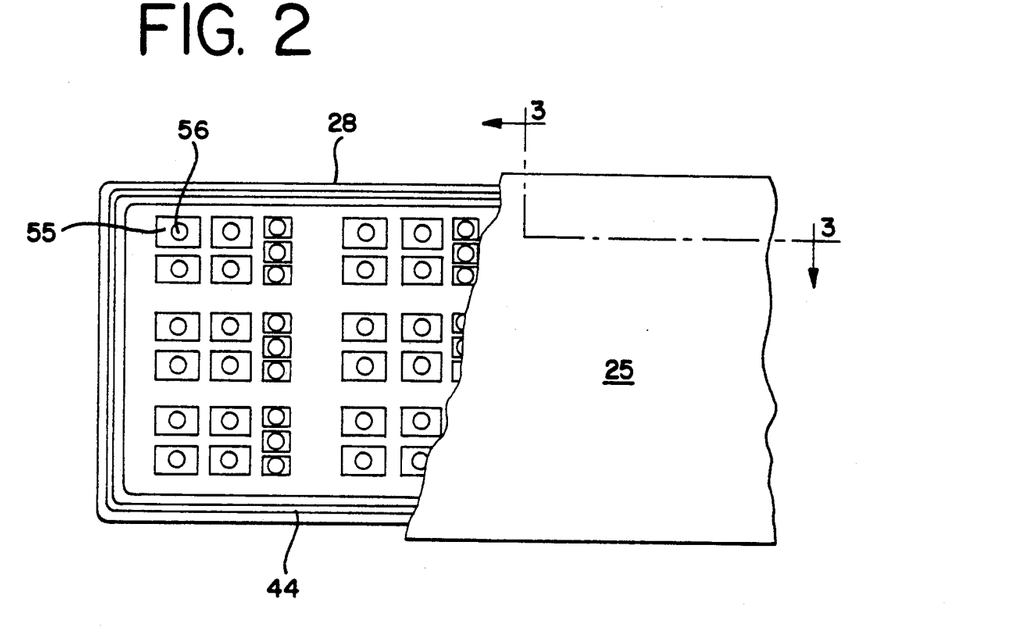
FIG. 2 is a plan view, partially broken away, from beneath the seal inspection station shown in FIG. 1.
Figures 4, 5, 6:
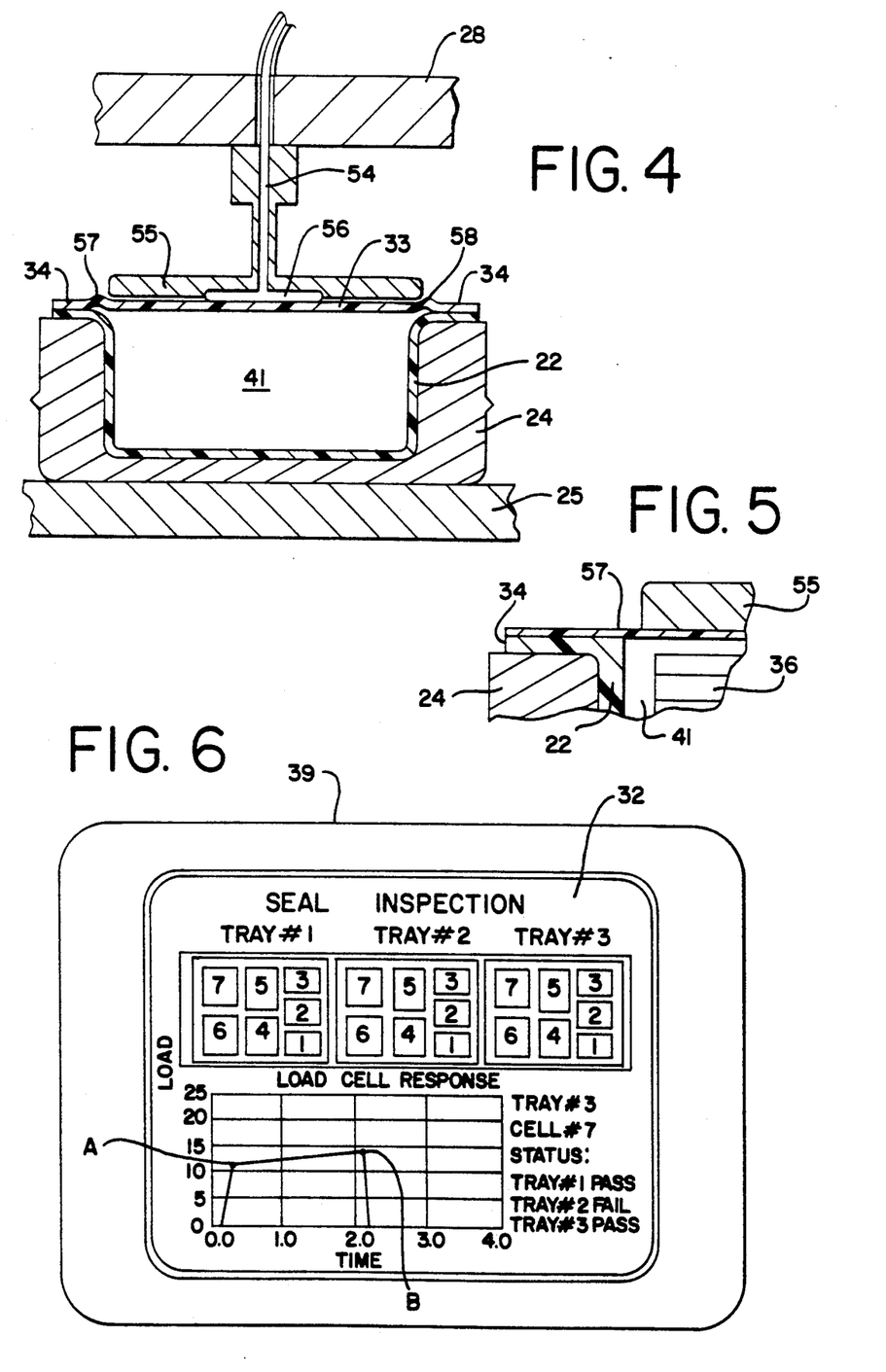
FIG. 4 is an enlarged detail, cross-sectional view of a seal inspection station of the type generally shown in FIG. 3, showing a properly sealed package.
FIG. 5 is a partial detail view similar to FIG. 4 and illustrating a leak condition.
FIG. 6 is a detailed view illustrating a display of a type which can be associated with the leak detection station of FIG. 1, depicting a typical curve for a gas flushed package which does not have a leak.

A wall pressure monitoring assembly 51, 52, 53 is provided. Included is a force transducer or load cell which senses the force exerted thereonto by cover 33. A preferred wall pressure monitoring assembly is illustrated in FIG. 2 and FIG. 4. For each compartment 41 of the package, an electronic force monitoring device or force transducer 54 is supported within a closure plate 55 secured to the test head 28. Each force transducer 54 has a pad 56. The undersurface of the pad 56 and of the closure plate 55 engage the outer surface of the package cover 33. Each closure plate 55 is preferably sized so as to substantially completely cover that portion of the package cover 33 which seals the mouth of the compartment 41, 42, 43. This close-fitting arrangement, coupled with the relative rigidity of package component 22 in the illustrated embodiment, ensures the testing operation is carried out on a substantially constant volume basis. It will be noted that, while each closure plate 55 conforms in size and shape to the mouth of the compartment 41, 42, 43 for which it is designed, the force transducer pad 56 can be virtually the same for any of the compartments.

A suitable electronic force monitoring device or force transducer 54 is a tension/compression submergible Model 31 Load Cell available from Sensotec of Columbus, Ohio. Devices of this type are resistor bridge strain gauges which detect small changes in resistance and which undergo virtually negligible travel throughout its range of pressure measurement activity. Maximum travel in this regard is 0.003 inch while being able to measure from 0 to 25 pounds of force applied to the package wall. The closure plate 55 contains the package while reduced pressure within the compartment 41, 42, 43 causes the package cover 33 to exert a force as the cover 33 tries to expand into the reduced pressure atmosphere. At this point, the package cover 33 presses on the pad 56, causing an electrical signal to be generated and transmitted through the wall pressure monitoring assembly 51, 52, 53 to a suitable processing unit. This force is measured or timed, while the package volume remains constant.

If the peripheral seal 34 is not interrupted and is of adequate strength, a force signal above a threshold value will be transmitted and recorded. If the seal is interrupted and a leak is present, the gas internal to the package (primarily the gas flush material) escapes into the reduced pressure atmosphere within the cavity 45. Either no force signal is transmitted, or a force signal below a threshold value is transmitted. In either case, the result is an indication of a defective peripheral seal 34.

Furthermore, the seal inspection apparatus and method can be operated in a manner to detect slow leaks. For example, it typically takes approximately two seconds or less to accomplish the leak detection procedure. When it is desired to detect slow leaks, multiple readings of the output from each individual force transducer 54 can be taken. Appropriate comparator means compare each new reading to the previous reading. For a gas flushed package, a falling off of the detected force indicates a reduction in pressure within the particular compartment being inspected. This condition is typically indicative of a slow leak from that compartment to the external environment. If this rate of force reduction is greater than that of a target rate reduction value, the package and/or compartment can be designated for rejection. For a vacuum sealed package, a rise of detected force to a designated level indicates the presence of a leak whereby fluid from the environment has entered the package through a leak site.

It has been found that many seals can give the appearance to the human eye or to other seal inspection devices of being intact when they are, in fact, marginally sealed. Many seals in this category, while they initially pass scrutiny when first manufactured, begin to develop leaking during product storage, handling, transportation, retail display and the like. Such a condition can be caused, for example, by having a small piece of meat, cheese or similar foreign substance, caught in the seal area. At the time of inspection, the foreign substance fills the hole within which it is positioned, but after storage, the foreign substance can dry out thereby creating a leak across the previously filled hole.

When it is desired to avoid possible "late leakers," the present apparatus and method can be used to carry out a pre-acceptance "shock test." By such an approach, each package or compartment is subjected to a relatively rapid reduction in environmental pressure during a short time period, for example within 100 milliseconds or less, in order to "shock" the seal with a pressure change that is strong enough to break open seals having a strength below a marginal level. The marginal level is one at which the seals are not strong enough to remain viable for a target shelf-life storage time and under anticipated handling conditions and the like. Once subjected to the pre-acceptance shock procedure, the latent leaker will be transformed into a leaker that is readily detected in accordance with the general principles of the invention. Tight containment of the packages during testing allows for much higher forces to be applied to the packages than if they were un-contained or loosely supported. These forces can be so high that a package can burst before its seal lets loose. By proceeding with the "shock" testing described herein, forces can be directed on the seal only in a controlled manner to whatever upper limit is desired.

Figure 7:
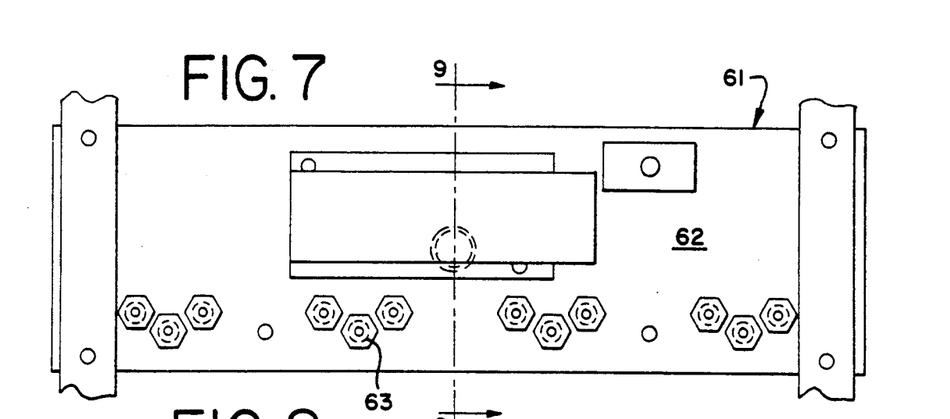
FIG. 7 is a top plan view, partially broken away, of another embodiment of a test chamber according to the invention.
Figure 8:
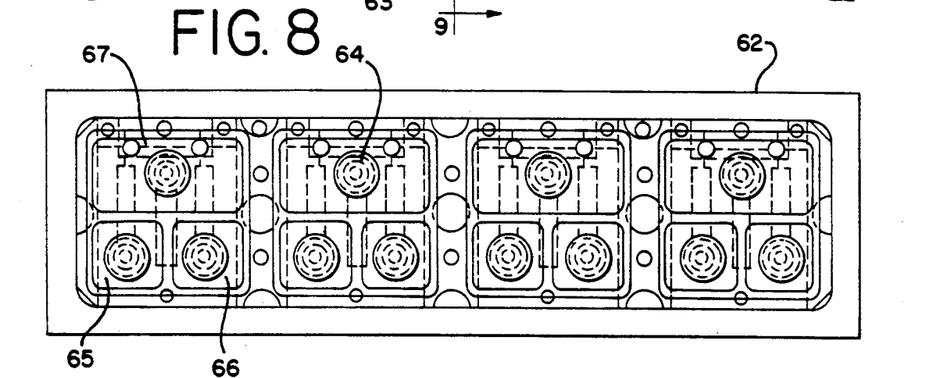
FIG. 8 is a bottom plan view of the test head of the test chamber illustrated in FIG. 7.
Figure 9:
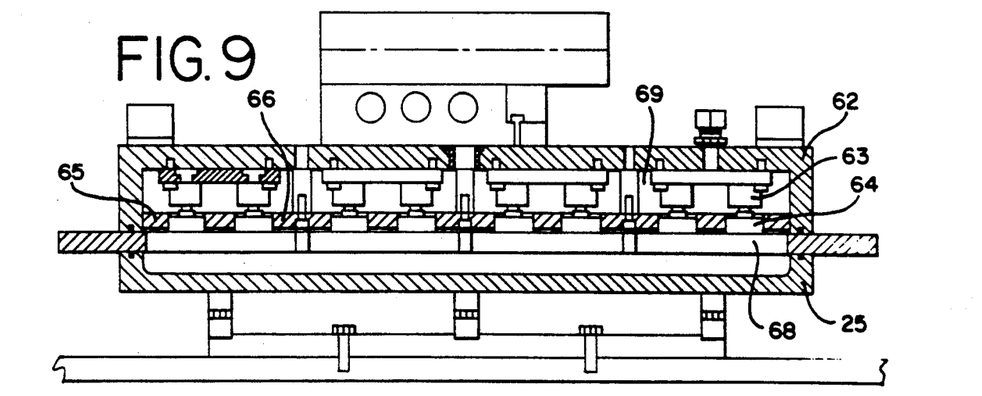
FIG. 9 is a cross-sectional view generally along the line 9—9 of FIG. 7.

Referring more particularly to the embodiment shown in FIGS. 7 through 11, a test chamber is generally illustrated as 61 in FIG. 7. Its test head 62 is shown in a bottom view in FIG. 8, and same forms a test cavity 69 with conveyor assembly 25. A total of nine force transducers 63, each having a pad 64, are shown. Each pad 64 is associated with a closure plate 65, 66, 67 which is sized to have a periphery equal in shape and slightly smaller in size when compared with the mouth of each compartment of the completed package. The completed packages are suspended by a support member 68 of the conveyor assembly 25. In this embodiment, the package trays are rigid enough to be able to omit a close fitting cavity of the type shown on the support frame 24 illustrated in FIGS. 3 and 4. Suitable means (not shown) can also be provided for ejecting packages that fail the inspection at any of the four illustrated locations.

Whether either illustrated embodiment is practiced, each force transducer 54, 63 monitors the force applied thereonto by the package wall which it contacts. In the illustrated embodiments, this package wall is the flexible package cover 33. This force is directly proportional to the internal package pressure. This general relationship can be represented by the equation $F = A(y-x)$, where F is the force monitored by the force transducer, A is the area of the face of each closure plate 55, 65 that engages the package cover 33, y is the pressure within the package compartment being inspected, and x is the pressure of the environment within the airtight cavity 45, 69. It will be appreciated that the area dimension will vary with the size of the package compartment being inspected. For the same pressure differential, a closure plate 55, 65, 66, 67 having a larger area will impart a proportionally larger force which will be detected by force transducer 54, 63. These pressure differences can, of course, be readily accounted for by appropriate means within the central processing unit 39. In a typical arrangement for gas flush testing, pressure within a compartment 41 will be on the order of about 15 to about 20 psia, and a suitable reduced pressure within the airtight cavity 45, 69 would be on the order of about 4 to about 8 psia. Generally speaking, a pressure differential in the general range of approximately 10 psia has been found to produce satisfactory results. It has been found that the accuracy of the present apparatus and method is on the order of about 0.08% when the force transducer having a detectable force range of 0 to 25 pounds is used.

Figure 11:
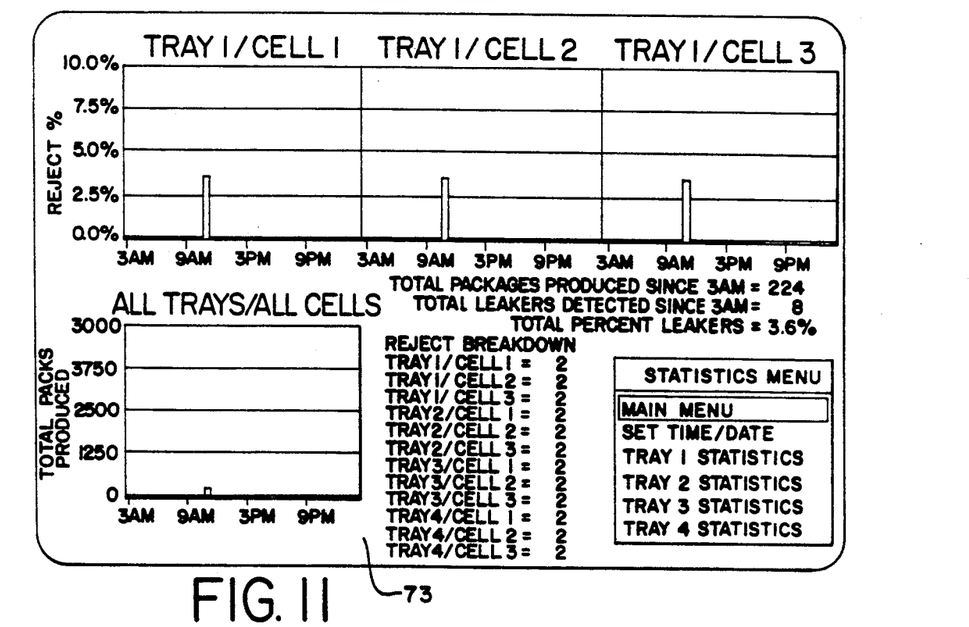
FIG. 11 is a detailed elevational view illustrating a display associated with a diagnostic function of the test chamber of FIGS. 7-9.
Figure 12:
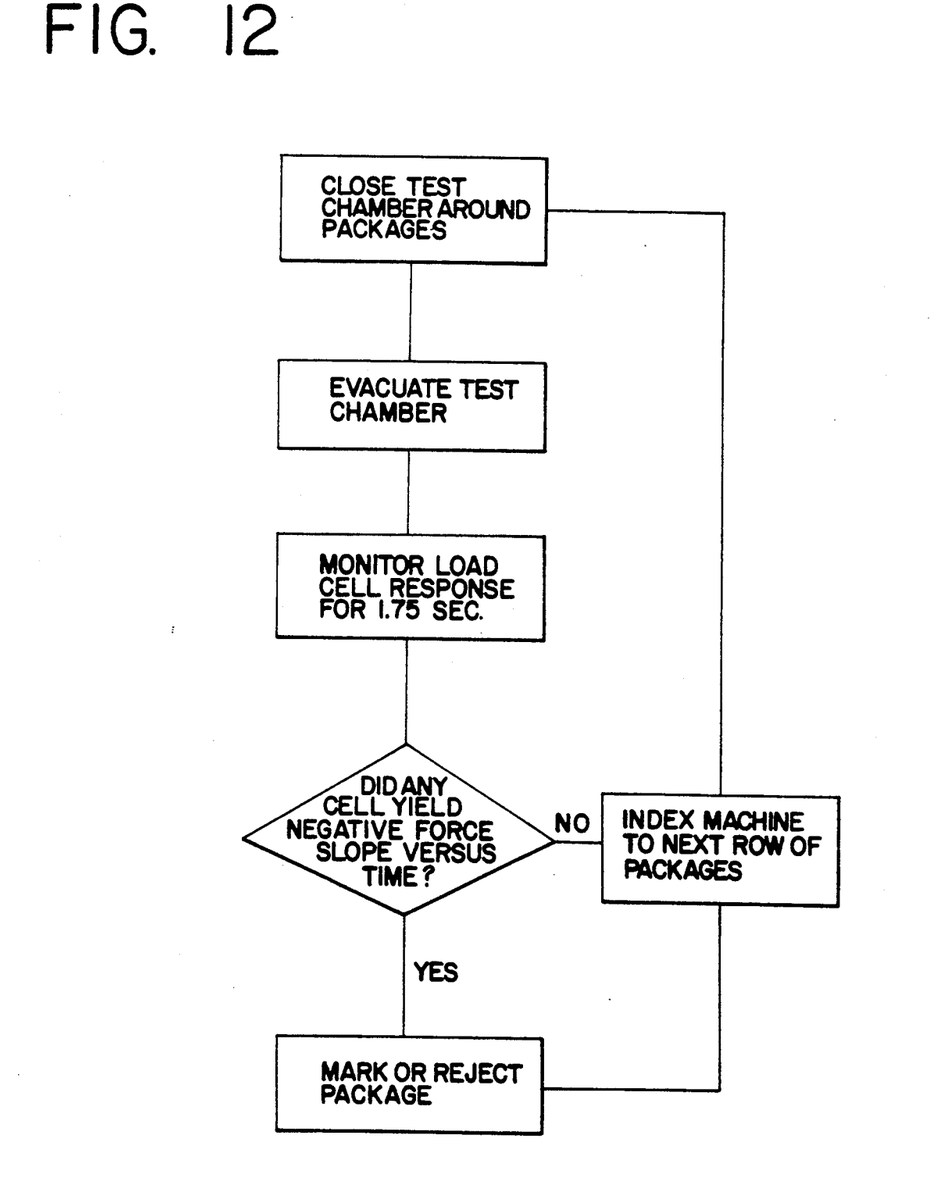
FIG. 12 a flow chart or algorithm associated with test chambers according to the invention.

The algorithm flow chart presented in FIG. 12 illustrates the sequence for a gas flush seal inspection. Reference will be made to the embodiments illustrated in the drawings. The test chamber is closed around the packages by lowering the test head 28, 62 until the seal 44 is compressed. The FIG. 1 and FIG. 2 embodiment show thus enclosing a total of nine completed packages 26, each having seven compartments 41, 42, 43. A force transducer having a load cell pad 56 and a surrounding closure plate 55 are provided for each of the thus enclosed compartments, a total of sixty-three of each being provided in this embodiment. Twelve load cell pads 64 and closure plates 65, 66, 67 are shown in the FIGS. 7 through 11 embodiment.

Next, the thus sealed airtight test chamber or cavity 45, 69 is evacuated by suitable pump means or the like (not shown). The central processing unit 39 monitors the response provided thereto by each load cell or force transducer 55, 64. This response, in the illustrated embodiments, is monitored for about 2 seconds or less. The central processing unit then determines whether or not there was an unacceptable negative force slope versus time developed for any of the compartments within any of the trays or completed packages 26. If no negative responses were detected, the machinery is indexed, and the next row or rows of packages are inspected. Appropriate steps can be taken to then reject any completed package wherein a defect was detected.

The monitor display 32 of FIG. 6 provides an illustrative display for three of the nine completed packages inspected in accordance with this embodiment. On the illustrated display, tray No. 1 corresponds to the completed package at location 1 of the seal inspection station 27. The same pattern is followed for the other trays. This allows the operator to determine the origin of the defect. If a pattern is thus discerned, appropriate corrective measures can be taken to inspect supplied package components or upstream stations corresponding to that particular location in, for example, the fill-and-seal unit 21. Similarly, the device individually monitors and reports upon each compartment within each such tray station. Again, corrective measures can be taken, if appropriate, to diagnose a problem as appropriate. For example, in the display presented in FIG. 6, the plot of force or load versus time is given for a completed gas flushed package or tray at station No. 3 and the compartment or cell No. 7 of that completed package. Also, the central processing unit displays the overall condition of each completed package or tray at each of the stations illustrated by this display. In the illustrated instance, this display records that packages in trays No. 1 and No. 3 passed the seal inspection procedure, whereas the package in tray No. 2 failed, and this tray should be removed from the processing line.

Figure 6A:
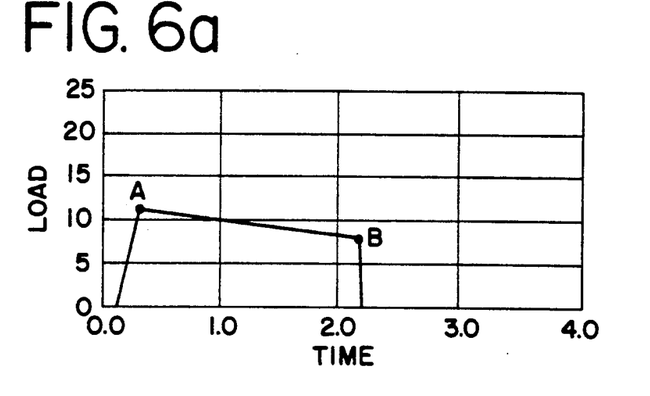
FIG. 6a is an illustration of a portion of the FIG. 6 display, depicting a typical curve for a gas flushed package having a leak.

It will be noted, in the display illustrated in FIG. 6, the plot of force versus time is relatively constant throughout the monitoring time, once equilibrium was reached, thereby indicating no leak was detected during that inspection procedure. In fact, the slope from illustration point A to illustration point B is positive for this gas flushed package. FIG. 6a illustrates a leaking gas flushed package that should be rejected. There is a negative slope wherein the load force decreases over time. A defective compartment would also be indicated by a failure of the curve to rise above a threshold force level. In the illustrated embodiment, for example, failure to rise to a force level of 10 pounds could be used as a threshold to indicate a compartment that failed the inspection.

Figure 6B:
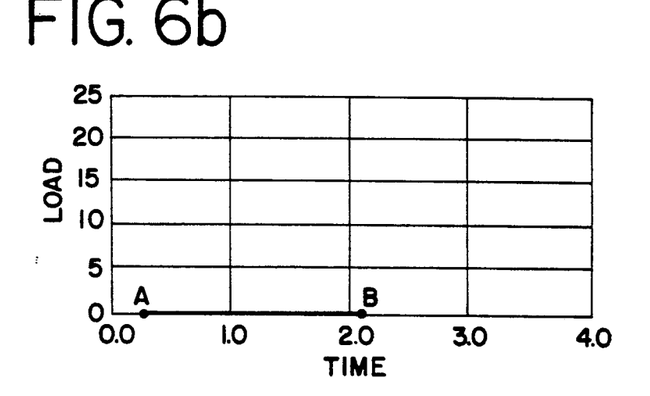
FIG. 6b is an illustration similar to FIG. 6a but for a vacuum package which passed the inspection.
Figure 6C:
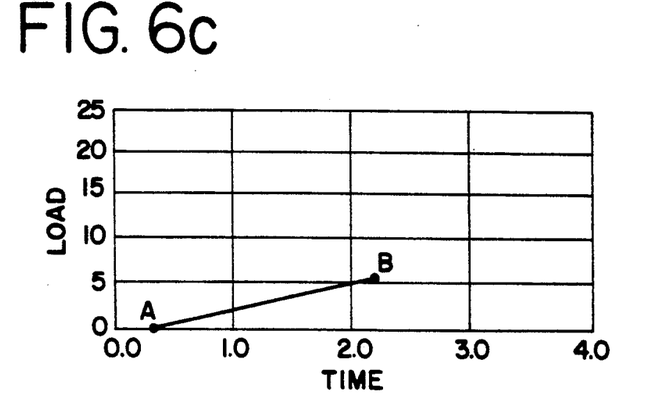
FIG. 6c is an illustration similar to FIG. 6a but for a vacuum package which failed the inspection.

FIG. 6b illustrates the display for a vacuum sealed package. No force on the film is recorded from time A to time B, indicating the package has passed the leak detection inspection. FIG. 6c illustrates a typical display for a defective vacuum package. Any force on the film such as indicated by the rise from point A to point B indicates a bad package since it shows there is gas inside the "vacuum" package, and it should be rejected.

Figure 10:
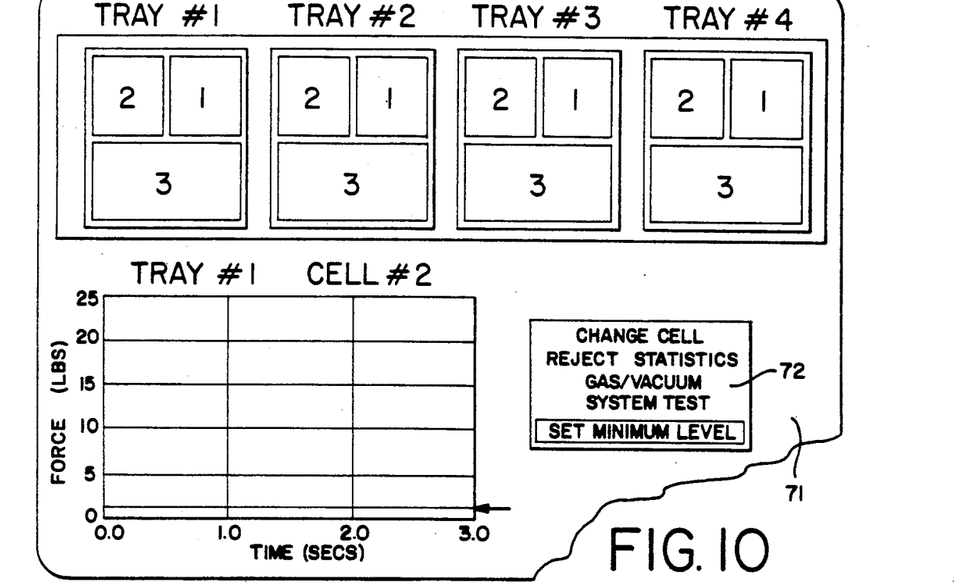
FIG. 10 is a detailed elevational view illustrating a display associated with the test functions of the test chamber of FIGS. 7-9.

Monitor display 71 of FIG. 10 provides a display of all four of the completed packages inspected in accordance with this embodiment. A menu 72 is shown for selecting among five different functions, namely "change cell" to change the compartment or cell number of the response being displayed on the monitor 71; "reject statistics" to display various statistics useful for diagnostic purposes, such as illustrated in FIG. 11; "gas/vacuum" to display the pressure profile of the sealing section during a gas/vacuum flush operation; "system test" which allows the operator to individually test each load cell; and "set minimum level" which allows the operator to change the minimum required load cell response. With further reference to FIG. 11, its display 73 is used to call up statistics stored in the central processing unit 39. For example, the apparatus records its operating statistics on an hourly basis. Included are the total number of packages produced, the total number of leakers detected, and a breakdown of the total leaks detected by individual load cells or force transducers 63. As illustrated in FIG. 11, data are reported for a time period between 3:00 a.m. and 11:00 a.m., during which time 224 packages were produced and 8 were rejected, for a rejection percentage of 3.6%. A breakdown is also given as to which cell(s) of which tray(s) recorded the rejects.

The action on a completed package 26 having a flexible cover film is illustrated somewhat schematically in FIG. 3, FIG. 4 and FIG. 5. In both of FIG. 3 and FIG. 4, the flexible cover film is shown with a slight outward bulge at opening location 57, 58. As previously discussed, this opening location is formed by the slight gap between the wall of the completed package, especially the vertical wall of the tray or package component 22, and the peripheral edge of the closure plate 55, 65, 66, 67. Opening location 57, 58 provides a narrow and closely controlled area within which the positive pressure differential can act upon the completed package. When an acceptable seal is present, the slight outward bowing develops at the openings 57, 58, as shown in FIG. 3 and FIG. 4. This bowing is somewhat indicative of the fact that pressure is being applied onto the closure plate and the force transducer pad 56, 64 by the action of the positive pressure which is thus exerted through the package cover 33 and onto the closure plate and pad. FIG. 5 illustrates a situation wherein no such bowing is present at opening location 57, thereby indicating a lack of adequate force being applied onto the closure plate. Preferably, the opening location has a width, for a typically sized package, of approximately 1/16th inch. Opening widths of as great as approximately ⅛th inch could be tolerated. This width should be minimized in order to minimize bowing and virtually eliminate any significant movement or pillowing of the package cover 33. Also, in accordance with the invention, the force transducer pad 56, 64 and closure plate 55, 65, 66, 67 are in virtual engagement with the package cover 33 prior to pressure reduction within the airtight cavity 45, 69. Because of the realities of production tolerances, the spacing of about 0.001 inch would typically be present. The objective is to have the package cover held down in a virtually perfectly flat condition in order to avoid any possible damage to the cover, which is particularly important when same is made of a flexible film.

It will be appreciated that the present apparatus and method provide means for detecting leaks across seals or in other parts of sealed packages, such as a pinhole within a wall of the package, in a very consistent and accurate manner. The system is "tunable," primarily by adjusting the extent of vacuum developed within the airtight cavity 45, 69 as well as the speed with which the vacuum is developed. This allows one to test for minute gaps or pinholes or for slow leakers or for seals which have a strength below a threshold value. The system can also be used as a diagnostic tool to help discern trends in leakers being developed at a particular station or with respect to a particular compartment of the finished packages. Because the system does not measure displacement and does not allow the package to move to any significant extent, constant volume of the package is maintained in order to thereby increase the overall accuracy of the unit and in order to minimize any risk of unintentional damage to the sealed package.

While particular embodiments of the invention have been described, it will be appreciated to those skilled in the art that various modifications thereof may be made without departing from the true spirit and scope of the invention. Accordingly, it was intended by the appended claims to cover all such modifications and equivalents which embody the inventive features as defined in the claims.

What is claimed is:

1. An apparatus for detecting leaks in filled and sealed packages, comprising:
    means for supporting a filled and sealed package, said supporting means being associated with a containment compartment;
    a cover member positioned opposite said containment compartment, at least one of said cover member or containment compartment being movable relative to the other between an opened mode and a closed mode whereby the supporting means is enclosed within said cover member and containment compartment when in the closed mode;
    a force transducer assembly associated with said cover member, said force transducer assembly being in contact with or extremely closely spaced from the package;
    said containment compartment and said cover member cooperating to provide a sealed cavity when the apparatus is in said closed mode;
    means for changing gas pressure within said sealed cavity while the package is between said supporting means and said force transducer assembly;
    a narrow opening adjacent the package to expose a narrow portion of the package to an environment external of the package and under the influence of said means for changing gas pressure;
    monitoring means in communication with said force transducer assembly for monitoring wall pressure of the package over time while said supporting means, force transducer assembly and package cooperate in maintaining a substantially constant volume of the filled and sealed package; and
    data channel means for comparing data from the force transducer assembly with data indicative of leak defective packages in order to indicate the package is acceptable or rejectable.

2. The apparatus in accordance with claim 1, wherein the narrow opening location is defined as an elongated and narrow opening positioned between a peripheral edge of the force transducer assembly and a wall of the filled and sealed package 3. The apparatus in accordance with claim 1, wherein the filled and sealed package has a sealed flange area generally co-extensive with a substantially flat panel of the filled and sealed package, and the narrow opening location is defined between the sealed flange area and a peripheral portion of the force transducer assembly.

4. The apparatus in accordance with claim 1, wherein the narrow opening location has a width of not greater than about 1/16th inch, and the opening location is adjacent a peripheral edge of the force transducer assembly.

5. The apparatus in accordance with claim 1, wherein said force transducer assembly includes a force transducer pad surrounded by a closure plate, said closure plate having a peripheral edge, and said narrow opening location is adjacent to and defined in part by the peripheral edge.

6. The apparatus in accordance with claim 5, wherein said narrow opening location has a width of not greater than about 1/16 inch.

7. The apparatus in accordance with claim 1, wherein the filled and sealed package is a gas flushed package which is a formed and shaped tray having a peripheral flange to which a flexible film cover is sealed to provide a sealed flange, and said narrow opening location is defined between said sealed flange and a peripheral edge of the force transducer assembly.

8. The apparatus in accordance with claim 7, wherein said narrow opening location has a width, defined between the force transducer assembly peripheral edge and the sealed flange, of not greater than about 1/16 inch.

9. The apparatus in accordance with claim 1, wherein the supporting means and the force transducer assembly cooperate to define the narrow opening location and to provide the substantially constant volume of the filled sealed package.

10. The apparatus in accordance with claim 1, wherein the force transducer assembly and a shaped and formed tray of the package cooperate to provide said substantially constant volume of the filled and sealed package.

11. The apparatus in accordance with claim 1, wherein said force transducer assembly includes a resistor bridge strain gauge to detect the wall pressure of the package.

12. The apparatus in accordance with claim 1, wherein the filled and sealed package is a gas flushed package, said gas pressure changing means is a means for evacuating gas within said sealed cavity, and said data channel means indicates a decrease in force detected by said force transducer over time.

13. The apparatus in accordance with claim 1, wherein the filled and sealed package is a vacuum package, said gas pressure change is a means for adding gas within said sealed cavity, and said data channel means indicates an increase in force detected by said force transducer over time.

14. The apparatus in accordance with claim 1, wherein the package has a plurality of individual sealed compartments, the force transducer assembly includes a force transducer for engagement with an outside wall of each said individual compartments, and the data channel means orders data input to the monitoring means so as to report which, if any, of said individual compartments has been identified as rejectable.

15. The apparatus in accordance with claim 14, wherein the data channel means includes data storage means for collecting numbers of rejectable compartments over a selected time period so as to report the total number of each compartment tested by the apparatus that had been identified as rejectable over a selected time period.

16. The apparatus in accordance with claim 1, wherein the filled and sealed package is a flexible film pouch, and said supporting means closely conforms to the size and shape of the flexible film pouch.

17. An apparatus for detecting leaks in gas flushed packages, comprising:
  means supporting a plurality of filled and sealed packages having a generally rigid tray component with a peripheral flange to which a flexible cover is sealed, the peripheral flange having an inside peripheral edge;
  enclosure means for providing a generally air-tight sealed compartment enclosing the supporting means and packages thereon;
  a force transducer assembly within said enclosure means and in substantial engagement with the flexible cover of the package, said force transducer assembly having a force transducer and a closure plate with a peripheral size slightly less than the inside peripheral edge of the tray component, thereby defining a narrow opening location;
  evacuation means for reducing gas pressure within said air-tight sealed compartment while said force transducer is in general engagement with the flexible cover of the package and while the narrow opening location is exposed to the gas pressure within the air-tight sealed compartment;
  monitoring means in communication with said force transducer for receiving data from the force transducer indicative of gas pressure forces upon the inside surface of the flexible cover; and
  data channel means for operating on the data from the force transducer to indicate whether or not said data fall within selected force transducer data parameters of an acceptable sealed package.

18. An apparatus for sealing and gas flushing packages and for detecting leaks in each gas flushed and sealed package, the apparatus comprising:
  means for imparting a gas flushed condition to a flow of packages while the packages are sealed in order to provide a filled, gas flushed and sealed packages;
  means for receiving the flow of and for supporting filled, gas flushed and sealed packages, said supporting means being associated with a containment compartment;
  a cover member positioned opposite said containment compartment, at least one of said cover member or containment compartment being movable relative to the other between an opened mode and a closed mode whereby the supporting means is enclosed within said cover member and containment compartment when in the closed mode;
  a force transducer assembly associated with said cover member, said force transducer assembly being in contact with or extremely closely spaced from the package;
  said containment compartment and said cover member cooperating to provide a sealed cavity when the apparatus is in said closed mode;
  means for changing gas pressure within said sealed cavity while the package is between said supporting means and said force transducer assembly;
  a narrow opening adjacent the package to expose a narrow portion of the package to an environment external of the package and under the influence of said means for changing gas pressure;
  monitoring means in communication with said force transducer assembly for monitoring wall pressure of the package over time while said supporting means, force transducer assembly and package cooperate in maintaining a substantially constant volume of the filled and sealed package; and
  data channel means for comparing data from the force transducer assembly with data indicative of leak defective packages in order to indicate the package is acceptable or rejectable.

19. A method for detecting leaks in filled and sealed packages, the method comprising the steps of:
  supporting a filled and sealed package, a gas-tight cavity generally surrounding the thus supported package;
  positioning a force transducer in substantial contact with a wall of the filled and sealed package;
  changing the pressure of the gas-tight cavity to thereby dynamically change pressure within the cavity while the package is therewithin;

monitoring force detected by the force transducer substantially throughout said pressure changing step to thereby monitor pressure exerted on the force transducer while maintaining a substantially constant volume of the filled and sealed package; and evaluating the results of the monitoring step to determine whether the package meets criteria of an acceptably sealed package.

20. The method in accordance with claim 19, wherein the filled and sealed package includes a generally rigid tray and a flexible cover sealed to the tray, wherein the supporting step supports the tray and exposes a portion of the flexible cover, wherein the wall of the positioning step is the flexible cover, and wherein the monitoring step determines positive pressure on the flexible cover wall.

21. The method in accordance with claim 19, wherein the supporting step and the positioning step cooperate to expose a narrow portion of the flexible cover.

22. The method in accordance with claim 19, wherein said evaluating step includes determining the slope of force transducer data versus time and rejecting packages for which the slope is outside of a selected criteria.

23. The method in accordance with claim 19, wherein said pressure changing step is carried out within a shortened time period to effect a sudden pressure drop shock to the sealed package, said shortened time period being about 100 milliseconds or less.

24. The method in accordance with claim 23, wherein said shortened time period is between about 50 and about 100 milliseconds.

25. The method in accordance with claim 19, wherein a plurality of packages are ordered in an array of locations on a packaging line and wherein each package has a plurality of compartments, further including ordering the results of the evaluating step for each array location and for each compartment of each array location, thereby diagnosing locations failing to meet said criteria of an acceptably sealed package.

26. The method in accordance with claim 19, wherein the filled and sealed package is a gas flushed package, the pressure changing step is a step of evacuating fluid from the gas-tight cavity, and the evacuating step determines whether the force of the monitoring step is below threshold data criteria.

27. The method in accordance with claim 19, wherein the filled and sealed package is a vacuum package, the pressure changing step is a step of adding fluid to the gas-tight cavity, and the evaluating step determines whether the force of the monitoring step is above threshold data criteria.

28. The method in accordance with claim 19, wherein the filled and sealed package is a flexible pouch, wherein the supporting step supports the pouch fully except for a narrow portion of a wall of the flexible pouch which is adjacent the force transducer of the positioning step, and wherein the monitoring step determines positive pressure on said wall of the flexible pouch.

* * * * *

UNITED STATES PATENT AND TRADEMARK OFFICE
CERTIFICATE OF CORRECTION

PATENT NO.   :   5,226,316
DATED        :   July 13, 1993
INVENTOR(S)  :   Mally et al It is certified that error appears in the above-identified patent and that said Letters Patent is hereby corrected as shown below:

Col. 4, line 11, "FIG. 12a" should read --FIG. 12a is--.
Col. 10, line 44, "package" should read --package.--.
Col. 11, line 31, "gas pressure change" should read --gas pressure changing means--.

Signed and Sealed this

Second Day of August, 1994

Attest:

BRUCE LEHMAN

*Attesting Officer*     *Commissioner of Patents and Trademarks*